March 28, 1967 W. J. BARTIK 3,311,750

SIGNAL TRANSLATING DEVICES UTILIZING SEQUENTIALLY OPERATED STORAGE DIODES

Filed July 18, 1963 2 Sheets-Sheet 1

INVENTOR
WILLIAM J. BARTIK

BY David Teschner

ATTORNEY

United States Patent Office 3,311,750
Patented Mar. 28, 1967

3,311,750
SIGNAL TRANSLATING DEVICES UTILIZING SEQUENTIALLY OPERATED STORAGE DIODES

William J. Bartik, Jenkintown, Pa., assignor to Sperry Rand Corporation, New York, N.Y., a corporation of Delaware Filed July 18, 1963, Ser. No. 296,018
3 Claims. (Cl. 307—88.5)

This invention relates to a signal translating device and more particularly to a device for generating signals at precisely timed intervals wherein said signal translating device employs the storage characteristics of storage diodes.

Signal generating devices known to the prior art which permit the generation of series of output signals at precisely timed intervals are complex to construct and difficult to maintain. These devices employ complex systems of oscillators and frequency stabilizing and controlling devices to insure the time of occurrence of the various output signals. The changing of the frequency or time of occurrence of the output pulses of such devices requires complex and bothersome recalibration and adjustment. It is, therefore, an object of this invention to provide a signal generating device which is capable of producing a series of output signals at precisely timed intervals and which is easily adjustable over a wide range of repetition rates.

It is an object of this invention to provide a signal generating device employing storage diode devices.

It is a further object of this invention to provide a signal generating device constructed of storage diode devices which can be simply adjusted with regard to the repetition rate of said signals.

It is a further object of this invention to provide an improved form of signal generating device which is simple to construct and whose repetition rate can be easily controlled.

It is yet another object of this invention to provide a signal generating device whose active elements are solid state elements.

Other objects and features of the invention will be pointed out in the following description and claims and illustrated in the accompanying drawings, which disclose by way of example, the principle of the invention, and the best mode for carrying it out.

Figure 2:
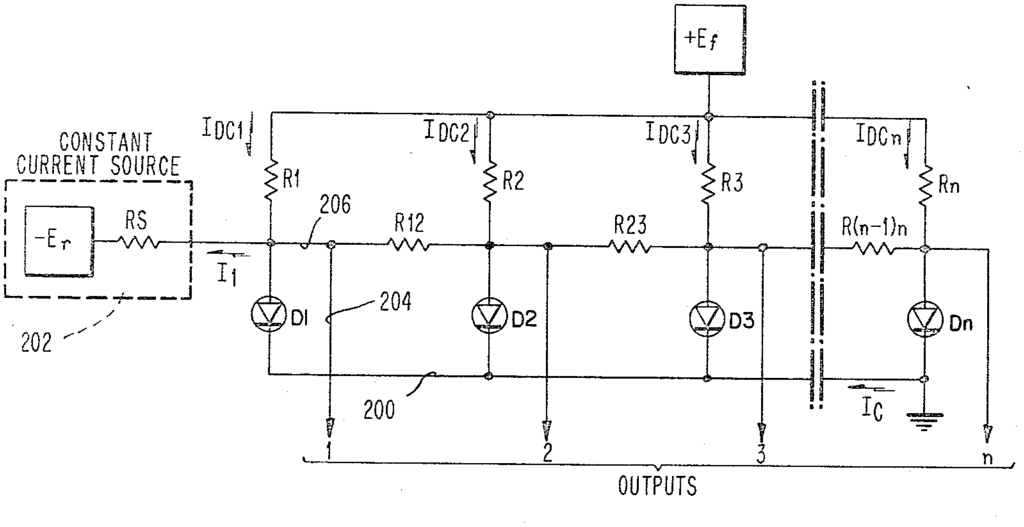
FIGURE 2 is a schematic drawing of one embodiment of the invention.
Figure 4A:
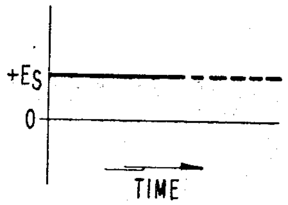
Figure 4B:
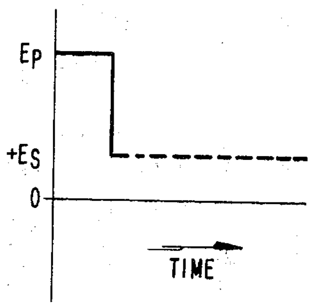

FIGURES 4*a* and 4*b* are timing diagrams of the driver source employed with the embodiment of FIGURE 2.

Figure 1:
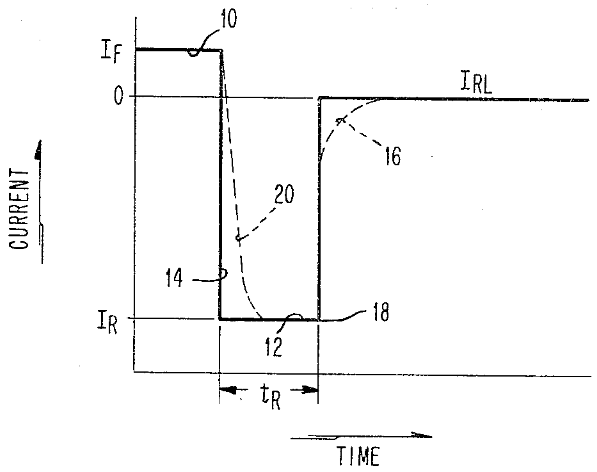
FIGURE 1 is a graphical representation of the characteristics of a typical storage diode.

Referring now to FIGURE 1, there is shown a typical characteristic of a semi-conductive storage diode of the type described in the January 1962 issue of the "Proceedings of the I.R.E.," at pages 43 to 53 by Moll et al. This characteristic is shown as a function of current versus time. The heavy continuous line is representative of the idealized characteristic. The dashed line is representative of a more typical characteristic actually obtainable. It is to be understood, of course, that certain noise and ringing effects may also occur, but are eliminated from the drawing for simplicity. In particular, the line 10 is representative of the current which is passed by the diode when the diode is biased in a forward direction, i.e. with the positive potential applied to the anode of the diode relative to its cathode. Line 10 also represents the low impedance state of the diode. When the potential applied to the anode of the diode is switched to a negative potential relative to its cathode, the current to the diode immediately switches in the ideal case from a forward current, to the reverse current $I_R$, designated by the line portion 12. This reverse current is provided by the withdrawal of charge stored within the semiconductor material of the diode. That is, the reverse current is created by the withdrawal of carriers injected into the material of the diode during the period the diode was forward biased and had current flowing through it in the forward direction. This reverse current will be proportional to the charge stored during the forward bias condition diminished by the amount of recombination which takes place within the diode material. At the termination of reverse current flow, that is when all charge carriers have been withdrawn or recombined, the diode will be placed in a high impedance state. The time during which this reverse current flows is designated $t_R$. If the loss of charge due to recombination is small, the charge acquired by the diode during application of forward biasing will be ideally equal to the charge which the diode will give up during the reverse bias operation.

The vertical line portion 14 suggests that the switching of the diode can be done instantaneously. This suggestion is, of course, only for the idealized case. Practically, the transition characteristic between the forward and reverse currents is more closely akin to the line portion 20 (shown dashed). Whenever a storage diode has been rendered conducting in a forward direction, a certain reverse current is exhibited by the diode when the potentials of the electrodes thereof are instantaneously reversed. In a properly designed storage diode, the bulk of the carriers will be withdrawn during the time $t_R$. The remaining carriers will be removed during a decay phase, as shown by dashed line 16, after time $t_R$. The length of this decay phase and the number of carriers affected will be negligible, as will the resulting current.

Referring now to FIGURE 2, a signal generating device constructed in accordance with the concepts of the invention and employing storage diode devices is illustrated. A number of storage diode devices, D1, D2, D3 through D*n* are connected via resistors, R1, R2, R3 through R*n*, respectively to a source of positive voltage $+E_f$. The application of the positive potential $+E_f$ across the resistors R1, R2, R3 through R*n* cause the forward biasing currents $I_{DC1}$, $I_{DC2}$, $I_{DC3}$ through $I_{DCn}$ to flow which go via the respective resistors to the anodes of the diodes D1, D2, D3 through D*n*. The cathodes of the diodes D1, D2, D3 through D*n* are connected through a common line 200 to ground. The anodes of the respective diodes are connected to one another by means of additional resistors. Thus, the anode of diode D1 is connected to the anode of diode D2 via a resistor R12, and in a similar manner the anode of diode D2 is connected to the anode of diode D3 via the resistor R23. Finally, the anode of the diode D*n* is connected to the anode of the diode D*n*–1 (not shown) by means of a resistor $R(n-1)n$. Output leads 1, 2, 3 through *n* are taken from the anodes of the respective diodes D1, D2, D3 through D*n*. The anode of the diode D1 is further connected via line 206 to a constant current source 202 composed of a source of negative potential $-E_r$ and a resistor RS. The constant current source 202 will provide a negative current sink which will permit the withdrawal of the charge in storage diodes in the manner described above.

Figure 3:
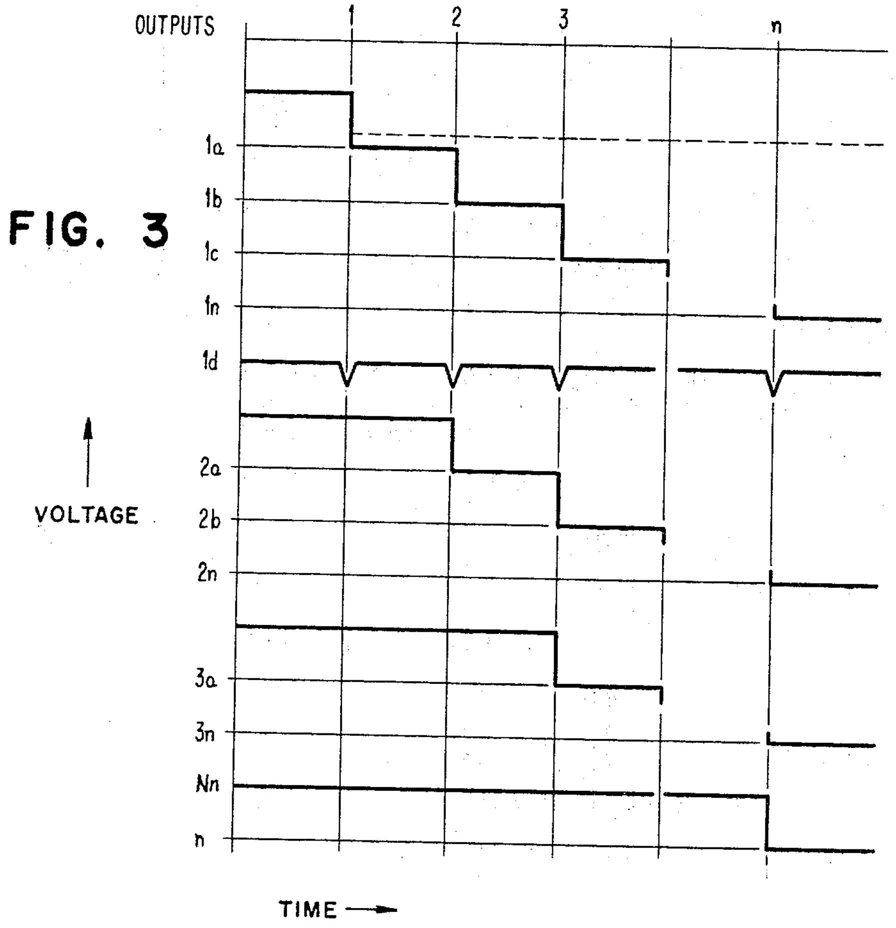
FIGURE 3 is a timing diagram showing the outputs available from the embodiment of FIGURE 2.

The operation of the device of FIGURE 2 may be explained as follows. The application of the positive potential $+E_f$ to the various resistors R1, R2, R3 through R*n* and thence to the anodes of the storage diodes D1, D2, D3 through D*n* causes these diodes to be forward biased to their low impedance states and to produce an output current as indicated in FIGURE 1 by the line 10. After sufficient time has elapsed to permit charge storage, a negative potential $E_r$ is applied to reverse bias the diode D1. The charge stored in diode D1 will flow to the current source 202 and the return current will flow from ground along the connecting line 200 to the diode D1. This current flow results from the withdrawal of carriers from the material as described above and when it has terminated the device in its high impedance state. The current resulting from the withdrawal of the stored charge will have the value of current $I_1$ minus the current $I_{DC1}$. The circuit will require a finite amount of time to withdraw the stored charge as shown by the line 12 of FIGURE 1 until the point 18 is reached at which time withdrawal of all stored charge is considered to terminate. When the withdrawal of charge has been completed, a differentiated output voltage can be detected at the output terminal 1. This output voltage at terminal 1 is due because when the withdrawal current ceases, it does so abruptly and the negative shift in voltage which accompanies the cessation of the withdrawal current is readily detected by a differentiator. This negative voltage shift then causes diode D2 to discharge and when its withdrawal current ceases there is a negative voltage shift experienced at the second output terminal and the first output terminal. The voltages available at the respective terminals 1 through N are negative as shown in FIGURE 3. Each charge removal will take place in the manner described with reference to diode D1 and will not be described in detail. The operation of charge withdrawal will continue until all the diodes through diode D*n* have been completed. As each diode is discharged, a signal will be produced from the output path which is connected to the anodes of the diodes. Once the operation of the device has been completed and the constant current source 202 is turned off, the source of positive potential $+E_f$ will cause the diodes D1 through D*n* to be forward biased once more to permit a repetition of the operation just described. The amount of time which must be allowed between consecutive cycles of the device will depend upon the characteristics of the particular storage diode device employed. The diode must have time enough to store a sufficient charge and operate along the portion of the FIGURE 1 illustrated by the line 10.

FIGURE 4*a* illustrates the application of a constant D.C. voltage supply $+E_S$ to the device. It should be understood that a certain finite time will be required to permit the storage of sufficient charge in the diodes. In order to decrease the amount of time required for the device to be made available for the generation of a further set of signals, a combination source consisting of a pulse source and a constant D.C. voltage source $+E_S$ may be employed. As illustrated in the FIGURE 4*b*, the source of pulses is applied during the first portion of the time period. The amplitude and length of duration of the pulse applied will be sufficient to cause the proper storage of carriers in the diodes device during a desired short interval of time. The storage in the diodes is controlled by the total charge which is determined by the magnitude of the voltage pulse and its duration. The pulse period is followed by the application of a steady D.C. positive potential $+E_f$ extending for the complete operation cycle of the signal generating device. With a combined source of this type, it is possible to achieve a faster recycling of the system. The control of the application of the pulses for injecting charge into the diodes as well as controlling the time of application and turn off of the constant current source 202 may be had by means of the main clock source of the computer (not shown). That is, a first clock pulse may turn on the pulse source to charge the diodes, a second clock pulse turn on the source 202 and a third clock pulse turn source 202 off. The only requirement as to the repetition rate of the clock pulses is that it be low enough to permit the desired operations to be completed during the time between successive clock pulses. Alternatively, the output of the diode D*n* may be (1) applied to turn off the constant current source 202, (2) applied to a pulse source (not shown) to generate the pulse $+E_p$ and (3) applied to a delay unit (not shown) the output of which will effectively turn on the source 202 once the storage of charge has been completed. Any other suitable means may be employed to control the required sources. The D.C. signal $+E_f$ will be maintained on during the entire operation of the device.

The current which flows from the stored charge of the first storage diode D1 was described above to be equal to the current $I_1$ minus the D.C. forward biasing current $I_{DC1}$. However, the current available from the second diode is decreased from that available from the first diode. The withdrawal current from the diode D2 is found to be equal to the current $I_1$ minus $(I_{DC1}+I_{DC2})$. Each succeeding diode will have a value of current which is decreased in a similar manner. That is to say, the withdrawal current from diode D*n* will be equal to $I_1$ minus the sum of the $I_{DC}$'s of all diodes I through *n*. Thus it can be seen that the amplitude of the withdrawal current from the final diode in a series, that is the diode D*n*, may be quite small. As was stated above, ideally the charge accumulated during the forward biasing period is equal to the amount of charge which may be reclaimed from the charge stored diode. Thus if the amount of storage is decreased during the period of the application of the forward biasing, a smaller withdrawal current will result in the same constant time, *tr*. Thus the resistors R1, R2, R3 to R*n* may be arranged to have an increasing value of impedance to insure that the amount of charge developed by the diodes D1, D2, D3 to D*n* decreases as a function of the position of the diode. In this manner, the withdrawal of the charges from each of the storage diodes will be in an equivalent time, *tr*, which constant from diode to diode is assured. The resistors R12, R23 through $R(n-1)n$ also have certain design criteria imposed upon them. They must be large enough to minimize current to any given stage from those of higher or lower orders due to differences in the diode forward voltage drops.

As has been described above, the device is controllable as to the repetition rate or time of occurrence of the respective outputs of the device. Considering the equations presented below which define the operation of the storage diode, the manner in which control can be achieved is readily understandable. The equation for charge storage during the injection time is:

$$Q_f=I_f\tau(1-\epsilon-t_f/\tau) \qquad (1)$$

where $Q_f$=forward charge
$I_f$=forward current
$t_f$=forward injection time
$\tau$=carrier lifetime (i.e. time a carrier can remain without recombining and thus not be available for withdrawal)

if $t_f<<\tau$ (2)

$$\epsilon-t_f/\tau \text{ approximates to } 1-\frac{t_f}{\tau} \qquad (3)$$

then Equation 1 becomes $Q_f=I_ft_f$ (4)

if $t_f>>\tau$ (5)

$$\epsilon\frac{-t_f}{\tau}\rightarrow 0 \qquad (6)$$

$$Q_f=I_f\tau \qquad (7)$$

The equation for the charge withdrawn during the reverse cycle of operation is:

$$Q_r=-I_r\tau\left(1-\epsilon\frac{-t_r}{\tau}\right)+Q_f\epsilon\frac{-t_r}{\tau} \qquad (8)$$

where $Q_f$=the stored charge during the forward bias operation as expressed by Equation 1

$t_r$=time of application or $I_r$ $I_r$=reverse current $Q_r$=total charge during the reverse period.

When $Q_r$ goes to zero, the charge withdrawal has been completed.

$t_R$—reverse recovery time $$I_r\tau(1-\epsilon-t_R/\tau)=Q_s\epsilon-t_R/\tau \quad (9)$$

if $t_R<<\tau$ (10)

$$I_r t_R=Q_s \quad (11)$$

if $t_R>>\tau$ (12)

$$I_r\tau=Q_s\epsilon-t_R/\tau \quad (13)$$

For intermediate cases between $t_R<<\tau$ and $t_R>>\tau$ $$\epsilon-t_R/\tau(Q_s+I_r\tau)=I_r\tau \quad (14)$$

$$\frac{t_R}{\tau}=\ln\left(1+\frac{Q_s}{I_r\tau}\right) \quad (15)$$

If operation of the device is limited to conditions where $t_f<<\tau$ and $t_r<<\tau$ then the charge withdrawn is equal to the forward charge injected and $Q_f=Q_r$ (21)

$$I_f t_f \text{ or } I_r t_R \quad (22)$$

Thus if the time of application of the forward current is controlled and the amount of reverse current $I_r$ is limited by the external circuitry of the storage diode, the reverse recovery time will be made a direct function of the forward bias current $I_f$. The time between switching of the respective diodes from their low impedance state to their high impedance states may be accurately controlled by the value of the positive potential source $+E_f$ and the values of the resistors R1 to R$n$. The most desirable mode of operation is that in which $\tau$, $t_f$ and $t_R$ are such that $I_f t_f=I_R t_R$. Equation 7 represents another acceptable method of charge storage which is dependent upon the forward bias current and the value of $\tau$ for the diode material employed. Equation 7 may be set equal to Equation 4 and give $$I_f\tau=I_r t_R \quad (23)$$

which is dependent upon the physical properties of the material. This dependence provides a limitation of this approach in that $\tau$ and consequently $t_R$ may vary from diode to diode.

Referring now to FIGURE 3, the relative timing of the outputs available from the terminals 1 through $n$ are shown. Line 1*a* shows the output available from the terminal 1 as a result of the completion of the charge withdrawal from diode D1. After the diode D1 is switched and as the charge withdrawal from diode D2 begins, the first negative step voltage is generated as shown in line 1*a*. As each successive diode in the line is switched to its high impedance state, the amplitude of the voltage available at the terminal 1 is decreased by one step for each such switching as shown by lines 1*b*, 1*c* and 1*n*. The reason for this is as follows. When each of the diodes has been charged (prior to applying $-E_r$) the difference of potential across each diode is equal as measured from group *d*. The potential difference as measured across resistor RS before $D_1$ is discharged is equal to the potential difference as measured across R12 and RS in series before $D_2$ is discharged, but after $D_1$ is discharged. Accordingly, after $D_1$ is discharged the voltage value at terminal 1 is less than before $D_1$ is discharged by the value of the voltage across R12. When the second diode D2 has its charge withdrawn, the current for switching diode D3 is applied to the resistor $R_{12}$ and the resistor $R_{23}$. Thus a voltage will be available at the terminal 1 which is equal to the current multiplied by the resistance R12 plus the current multiplied by the resistance R23. As each successive diode is switched, the voltage again will be diminished by the current times the resistor value associated with the diode.

If the outputs 1 through $n$ are connected to threshold type amplifiers, (not shown) which are not level sensitive, the output at the terminal 1 will appear as shown in the line 1*a* by the dashed line. That is, providing a certain minimal value of signal is available, an output will be produced. However, increases in the amplitude of the signal available at the terminal 1 will not increase the output of the amplifier. Thus, the amplifier, at the position of the switching of the first diode, will provide a constant level signal for the entire duration of the recombination of the diodes D1 through D$n$. On the other hand, if the terminals 1 through $n$ are connected to the differentiating devices (not shown) an output as shown in line *d* will be produced. For each change in level of the output as shown in line *b*, a short duration pulse will be produced as indicated by the line 1*d*. The outputs for the diode D2 as shown by lines 2*a*, 2*b* and 2*n* are similar to that described with reference to the diode D1, but will commence when the second diode is switched and continue until the *n* diode is switched. Similarly lines 3*a* and 3*n* describe the outputs of diode D3 while line N*a* describes the output of diode D*n*.

While there have been shown and described and pointed out the fundamental novel features of the invention as applied to the preferred embodiment, it will be understood that various omissions and substitutions and changes of the form and details of the device as illustrated and its operation may be made by those skilled in the art without departing from the spirit of the invention.

The embodiments of the invention in which an exclusive property or privilege is claimed are defined as follows:

1. A signal translating device for producing a series of output signals comprising: a plurality of storage diode means each having an anode and a cathode, said diodes capable of being switched between high and low impedance states; a bias source connected to all of the anodes of said diode means to place said diodes in a low impedance state; a potential source connected to all of the cathodes of said diode means; resistor means connected between the anodes of successive diode means; an input source connected through said resistor means to the anode of each of said diode means to sequentially switch said diodes from said low impedance state to said high impedance state; and a plurality of output means each connected to the anode of a different one of said diode means to provide an output signal when its associated diode means is switched to its high impedance state.

2. A device as claimed in claim 1, wherein said bias source is a voltage source connected to the anodes of said diode means through parallel branches each containing a second resistor means.

3. A device as claimed in claim 1, wherein said bias source is a voltage source connected to said anodes of said diode means through parallel branches each containing a graduated resistor means, the impedance of said resistor means decreasing for each consecutive diode means.

References Cited by the Examiner

UNITED STATES PATENTS

| | | | |
|---|---|---|---|
| 3,121,810 | 2/1964 | Horna | 307—88.5 |
| 3,200,267 | 8/1965 | Cubert | 307—88.5 |
| 3,235,748 | 2/1966 | Mahoney et al. | 307—88.5 |

ARTHUR GAUSS, *Primary Examiner.*

R. H. EPSTEIN, *Assistant Examiner.*